United States Patent
Schenk et al.

(10) Patent No.: US 6,837,039 B2
(45) Date of Patent: Jan. 4, 2005

(54) DEVICE AND METHOD FOR CONTROLLING AN INTERNAL COMBUSTION ENGINE

(75) Inventors: Peter Schenk, Schwalmstadt (DE); Volker Ricken, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/315,890

(22) Filed: Dec. 10, 2002

(65) Prior Publication Data

US 2003/0140618 A1 Jul. 31, 2003

(30) Foreign Application Priority Data

Jan. 26, 2002 (DE) .......................................... 102 03 025

(51) Int. Cl.⁷ ................................................. F01N 3/00
(52) U.S. Cl. ............................. 60/284; 60/274; 60/280; 60/285
(58) Field of Search ........................ 60/274, 280, 284, 60/285, 286

(56) References Cited

U.S. PATENT DOCUMENTS

| | | | | |
|---|---|---|---|---|
| 4,612,770 A | * | 9/1986 | Tadokoro et al. | 60/602 |
| 5,496,228 A | * | 3/1996 | Takata et al. | 477/107 |
| 5,974,792 A | * | 11/1999 | Isobe | 60/278 |
| 6,449,946 B2 | * | 9/2002 | Kuji et al. | 60/286 |
| 6,651,432 B1 | * | 11/2003 | Gray, Jr. | 60/605.2 |

FOREIGN PATENT DOCUMENTS

DE          43 27 882 C1        9/1994

* cited by examiner

Primary Examiner—Binh Q. Tran
(74) Attorney, Agent, or Firm—Michael J. Striker

(57) ABSTRACT

A device and method for controlling an internal combustion engine (2) includes a charger (7) for increasing pressure of air supplied to the engine. IN addition, a catalyzer (10) for refining exhaust of the engine is provided. In dependence on the temperature of the catalyzer (10), the charger (7) is activated and the time point of the combustion is shifted in the direction of "late".

7 Claims, 1 Drawing Sheet

DEVICE AND METHOD FOR CONTROLLING AN INTERNAL COMBUSTION ENGINE

BACKGROUND OF THE INVENTION

The present invention relates to a device and method for controlling an internal combustion engine.

German Patent DE 4327882 discloses a method for controlling an internal combustion engine, which serves to quickly heat up a catalyzer to an operating temperature. In this connection, the air mass flow supplied to the engine (in connection with an adaptation of the fuel volume flow) is increased and the ignition angle is adjusted as wide as possible, or to a logical position, in the direction "late". Through these features with an unchanged engine moment of rotation, the exhaust mass flow and the exhaust temperature increases (boost of the exhaust enthalpy flow), which leads to a faster heating of the catalyzer.

SUMMARY OF THE INVENTION

The inventive device and method have the advantage of an additional acceleration of the heating of the catalyzer. Further, the combustion is particularly low in contaminants or exhaust. As a result, then, the exhaust output of the combustion engine in the warm-running phase is specifically reduced.

In order to further accelerate the heating of the exhaust catalyzer with charged engines, during the catalyzer heating phase, the supercharger is activated (an also in the engine operation area, in which, instead, no charging is provided), so that by the charging, a further boost of the exhaust enthalpy flow is provided. Based on the very sharply increased exhaust mass flow, through the late initiation of the combustion process (the combustion begins specifically after achieving the upper piston dead center) without reference to the provided mechanical load, also conditions exist for the case of charging by an exhaust turbo-charger, which permits an activation of the charging. The invention can be used with diesel engines as well as gasoline engines. Particularly advantageous is the use with a gasoline engine with direct gasoline injection, since with a separate injection, extremely late ignition time points are possible. This can take place in the magnitude of 35° after the upper dead center of the piston. By means of these latter features alone, the heating of the catalyzer is likewise markedly accelerated.

DETAILED DESCRIPTION OF THE PREFERRED EMBODIMENTS

Figure 1:
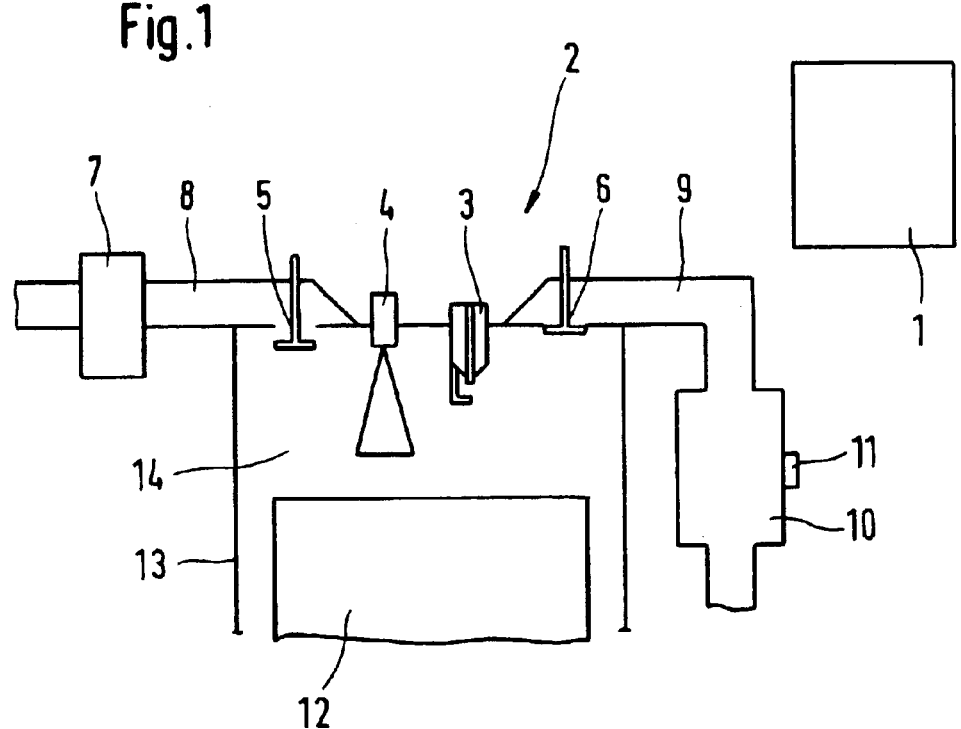
FIG. 1 shows a schematic view of a combustion engine.

In FIG. 1, a combustion engine is shown, particularly, an Otto carburetor engine with direct injection of gasoline. The engine 2 has a cylinder 13, in which a piston 12 is arranged. Through the cylinder 13 and the piston 12, a combustion chamber 14 is created, into which a spark plug 3 and an injection valve 14 open. Through the injection valve 4, a fuel, particularly gasoline, can be injection into the combustion chamber 14. By means of the spark plug 3, a high-voltage spark is produced, which serves to ignite a gasoline-air mixture. The supply of air to the combustion chamber 14 takes place by means of a suction or induction channel 8. The intake of air into the cylinder 13 is controlled by the intake valve 5. In addition, a charger 7 is shown, which serves to increase the pressure of the air in the suction channel 8, such that a greater air volume can be brought into the cylinder 13. The piston 12 moves in the cylinder 13 in an up and down movement and is connected to a crank shaft via a piston rod.

When an air-fuel mixture is burned in the combustion chamber 14, a pressure increase occurs in the combustion chamber 14, which is converted into a corresponding movement of the piston 12. With normal operation of the engine, the time point of the combustion is controlled such that the energy released through the combustion is converted as much as possible into movement of the piston (mechanical work). The portion of energy produced by the combustion that is not converted into mechanical work is converted into heat. An essential part of this heat, therefore, is contained in the combustion product, that is, the exhaust. The exhaust is lead away from the combustion chamber 14 via the outlet valve 6 through the outlet channel 9 and subsequently treated in a successively arranged catalyzer 10. This catalyzer must be heated to a determined minimal operating temperature (approximately 300–350° C.), so that the conversion of the contaminant components in the exhaust can take place and a refining or cleaning of the exhaust is achieved. The temperature of the catalyzer is measured by means of a temperature sensor 11 disposed on the catalyzer or modeled in dependence of relevant limiting conditions with the assistance of the engine control software.

Further, a control apparatus 1 is provided, which controls the components shown here, such as, for example, activating the charger 7, releasing the ignition spark of the spark plug 3, causing injection by means of the injection valve 4 or the actuation point of the valve, 5, 6, as far as the latter are not provided on a clean mechanical path in dependence on the crank shaft position. To this purpose, the control apparatus is connected with the named components with lines (not shown here). Further, the control apparatus 1 contains a plurality of sensor data, particularly also the temperature signal of the temperature sensor 11.

According to the present invention, it is provided that the charger 7 is activated by the control apparatus 1 in dependence on a temperature of the catalyzer 10, and simultaneously, features are met, which cause a faster heating of the catalyzer 10. In normal operation, the charger 7, then, is only activated when an increased efficiency of the engine is necessary. Generally, in idle or in partial-load operation, the air supplied to the combustion engine is not supercharged, since in this operating condition, no increased filling of the cylinder with combustion air is desired. The activation of the charger 7 causes, specifically, an increased filling of the cylinder 13 with air, and therewith, an increase in efficiency of the engine, which in the idle or partial load operating conditions, is not desired. According to the present invention, the charger 7 is activated for the purposed of heating the catalyzer also in such operating conditions, in which, with a heated catalyzer, normally no activation of the charger 7 takes place. Upon activation of the charger 7 in these operating conditions, then, additional combustion air can be used, in order to affect a particularly fast heating of the catalyzer 10, since the exhaust mass flow and the temperature of the exhaust can be increased. Further, the combustion in the combustion chamber 14 takes place with an activated charger 7 also in the idle and partial-load areas that is particularly low in contaminants. These two effects of activation of the charger 7 also in the idle and partial-load operation, therefore, lead to a significantly smaller contaminant output during a warm-running phase of the combustion engine as a result.

With a gasoline engine, in which the combustion time point is provided by means of the ignition spark of the spark plug 3, it should also be noted that a combustible mixture must be present at the spark plug 3. In normal operation of the engine, in which the energy released in the combustion is to be converted as completely as possible into mechanical movement of the piston 12, the ignition time point takes place before the upper dead center of the piston 12, whereby shortly after the upper dead center of the piston 12, the pressure in the combustion chamber 14 achieves a maximal value, which then is converted into a corresponding movement of the piston 12. In order to increase the temperature of the exhaust, it is possible to displace the time point of the ignition spark on the plug 3 in the direction of "late", so that the combustion first take place when the piston 12 already has moved downward significantly. Then, a smaller part of the combustion energy in converted into mechanical work and the exhaust experiences a corresponding rise in temperature. It has also been shown that through the activation of the charger 7, and therewith by the increase of the air mass for supplying to the combustion, a relatively higher portion of the energy existing in the combustion can be carried off into the exhaust assembly. In addition to the increased air volume, a further effect of the activation of the charger is that a particularly late time point for the combustion in the combustion chamber 14 is possible. That is, the relative portion of the energy, which flows as heat in the exhaust, can be increased. Furthermore, this portion can be increase when a gasoline engine with direction injection of the gasoline is employed. Therefore, the operating manner "homogenous split" is used. In this manner of operation, a first injection of fuel takes place in the so-called induction stroke, that is, with an opened intake valve 5, when air flowed into the combustion chamber through the suction channel 8. A further injection takes place, then, with a closed intake valve 5, in particular, shortly before the piston reaches it upper dead center. An increased enrichment of the fuel is affected in the area of the spark plug 3, so that at the spark plug 3, also a combustible mixture is present when the piston 12 is located after its upper dead center already again in the downstroke. Through this manner of operation, "homogenous split", it is possible to produce combustion in the combustion chamber 14 with an ignition spark, which is 30 to 35° above the upper dead center point. The portion of the freed combustion energy, which is again found in the exhaust as heat, is distinctly increased. Through the charging of the supplied air through the charger 7 and the extremely late ignition time point by means of the "homogenous split" manner of operation, the combustion process in the combustion chamber 14 is affected such that an extremely fast heating of the catalyzer 10 takes place.

Figure 2:
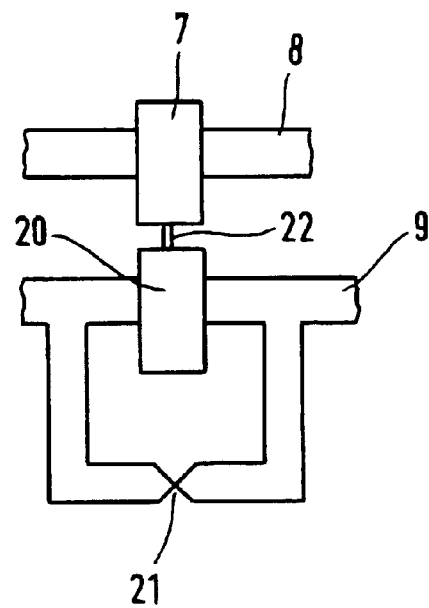
FIG. 2 shows a schematic view of an exhaust turbocharger.

This is also the case with the use of a so-called exhaust turbo-charger as the charger 7. In FIG. 2, an exhaust turbo-charger of this type of schematically illustrated. Show again is the suction channel 8 with the charger 7, which causes a pressure increase of the combustion air to be supplied to the engine. The charger 7 is driven by means of a shaft 22, which is connected to an exhaust turbine 20. The exhaust turbine 20 is disposed in the outlet channel 9. The exhaust turbine is driven by the exhaust, that is, it operates as a turbine wheel, which is arranged in the exhaust flow. Since the exhaust turbine 20 removes energy from the exhaust, the activation of the turbine 20 causes a known cooling of the exhaust. The control of the exhaust turbine 20 takes place in the common manner by means of a bypass valve. With an opened bypass valve 21, the largest part of the exhaust flow flows to the turbine depending on the flow resistance of the bypass valve and the exhaust turbine. First, with a partial or complete closing of the bypass valve 21, an increasingly greater exhaust flow is supplied via the turbine 20 and via the shaft 22, driving of the charger 7 is affected.

According to the present invention, it is provided that this bypass valve 21 is closed also in operating conditions in which normally it would be opened, in order to cause the desired, fast heating of the catalyzer 10. Or independently of the position of the bypass valve, the bypass valve is closed in the event of heating of the catalyzer and, thus, by use of charging, the process of the catalyzer heating is accelerated. The exhaust enthalpy flow is lowered, upon passing through the turbine of the activated exhaust turbo-charger based on the mechanical output provided by the exhaust turbine for compression of the combustion air. However, in total, the exhaust enthalpy flow provides a chemically latent energy compared to the non-activated charger based on an increased exhaust mass flow as well as a greater, used flow. This energy results from the combustion stoichiometric, conditional proportioning of the fuel mass flow on the increased air mass flow, as a total effect, a higher exhaust enthalpy flow for heating of the catalyzer.

Through the use of the charger 7, the entire quantity of the energy released with the combustion is increased. Further, a greater percentage of the released energy is not converted into mechanical energy by means of the displacement of the combustion limits and is useable as energy for accelerating heating of the catalyzer. This means an additional gain is provided, which cannot be accounted for simply by the increase of the total energy of the combustion process. In particular, the percentage of the freed combustion energy for the heating of the catalyzer 10 is displaced markedly, when the "homogenous split" manner of operation is selected with an externally ignited engine (that is, a gasoline engine) with direction injection of fuel into the combustion chamber 14. In this type of operation, the part of the released combustion energy that is used for heating of the catalyzer, is increased. All of these features lead to the result of a particularly fast heating of the catalyzer 10.

In FIG. 1, an externally ignited engine is shown. The invention, however, can also be used with self-igniting, or diesel engines. A diesel engine differs in the schematic representation from that of FIG. 1 only in that no spark plug 3 is provided. All of the other components of this type of engine correspond to the schematically represented components as shown in FIG. 1. Also with self-igniting engines, that is, diesel engines, the inventive effective is provided that through compression of the combustion air to be supplied, an accelerated heating of the catalyzer can be caused. The combustion time point is controllable in diesel engines by the time point of the injection. Also here, by means of the supplying of supercharged air into the combustion chamber, the total volume of the energy from the combustion can be increased. Furthermore, by means of a later injection of the fuel, the percentage of the freed combustion energy that is used to heat the catalyzer is increased. By activating the charger, injection time points are possible, which are later than the injection time points that are possible without activation of the charger 7. Through activation of the charger 7, the percentage of the combustion energy, which can be used to heat the catalyzer, is shifted so that an accelerated heating is caused.

It will be understood that each of the elements described above, or two or more together, may also find a useful application in other types of constructions differing from the types described above.

While the invention has been illustrated and described herein as a device and method for controlling an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for controlling an internal combustion engine (2), comprising a charger (7) for increasing pressure of air supplied to the engine (2), wherein a catalyzer (10) for refining exhaust of the engine (2) is provided, wherein a combustion time point of the engine (20) is controllable, means for activating the charger (7) in dependence on a temperature of the catalyzer (10) for heating of the catalyzer (10) to an operating temperature, and means for shifting the combustion time point in a direction of "late".

2. The device as defined in claim 1, wherein the charger (7) is activated in an operating area, wherein said charger (7) is not activated in said operating area when the catalyzer (10) has reached the operating temperature.

3. The device as defined in claim 1, wherein the combustion time point occurs after an upper dead center of a piston (12) of the engine (2).

4. The device as defined in claim 1, wherein said engine (2) operates as a self-igniting combustion engine, and wherein the combustion time point is affected by a corresponding control of an injection valve (4).

5. The device as defined in claim 1, wherein said engine (2) operates as an externally ignited engine, and wherein the combustion time point is affected by production of an ignition spark at a spark plug.

6. The device as defined in claim 5, wherein an injection valve (4) is provided, wherein said injection valve (4) injects fuel directly into a combustion chamber (14) of the engine (2), wherein an intake valve (5) between the combustion chamber (14) and an induction port (8) is provided, and wherein a first injection in a suction phrase of the engine takes place when said intake valve (5) is open and wherein a second injection takes place when seid intake valve (5) is closed shortly before an upper dead center of a piston (12) is reached.

7. A method for controlling an internal combustion engine (2), comprising the following steps:

providing a charger (7) for increasing a pressure of air supplied to the engine;

providing a catalyzer (10) for refining exhaust of the engine, wherein a time point of a combustion of the engine is controllable;

activating a charger (7) in dependence on a temperature of the catalyzer (10) for heating of the catalyzer (10) to an operating temperature: and shifting the time point of combustion in a direction of "late".

* * * * *